(12) United States Patent
Yapici et al.

(10) Patent No.: US 12,738,981 B2
(45) Date of Patent: Sep. 15, 2026

(54) BEAM AND SURFACE PARTITION SUBSET SELECTION FOR A MULTI-PARTITIONED RECONFIGURABLE INTELLIGENT SURFACE

(71) Applicant: QUALCOMM Incorporated, San Diego, CA (US)

(72) Inventors: Yavuz Yapici, Florham Park, NJ (US); Narayan Prasad, Westfield, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/360,513

(22) Filed: Jul. 27, 2023

(65) Prior Publication Data

US 2025/0038790 A1 Jan. 30, 2025

(51) Int. Cl.
*H04B 7/04* (2017.01)
*H04B 7/06* (2006.01)

(52) U.S. Cl.
CPC ....... *H04B 7/04013* (2023.05); *H04B 7/0617* (2013.01)

(58) Field of Classification Search
CPC .......................... H04B 7/04013; H04B 7/0617
See application file for complete search history.

(56) References Cited

U.S. PATENT DOCUMENTS 11,595,106 B1 2/2023 Gurelli et al.
2023/0188170 A1* 6/2023 Dutta .................... H04W 24/08 375/346

(Continued)

FOREIGN PATENT DOCUMENTS

EP 4231458 A1 8/2023
WO 2022100471 A1 5/2022

(Continued)

OTHER PUBLICATIONS

A. Y. Liu et al.; Reconfigurable Intelligent Surfaces: Principles and Opportunities, Published May 5, 2021, IEEE Communications Surveys and Tutorials vol. 23 No. 3 Third Quarter 2021, 32 pages (Year: 2021).*
Partial International Search Report—PCT/US2024/036719—ISA/EPO—Oct. 22, 2024.
International Search Report and Written Opinion—PCT/US2024/036719—ISA/EPO—Jan. 8, 2025.

*Primary Examiner* — William Kelleher
*Assistant Examiner* — Isabella Ameyali Edrada
(74) *Attorney, Agent, or Firm* — QUALCOMM Incorporated

(57) ABSTRACT

Various aspects of the present disclosure generally relate to wireless communication. In some aspects, a reconfigurable intelligent surface (RIS) device may receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The RIS may activate the first subset of the multiple surface partitions. The RIS may deactivate a second subset of the multiple surface partitions, each surface partition in the second subset not being included in the first subset. Numerous other aspects are described.

30 Claims, 13 Drawing Sheets

(56) References Cited

U.S. PATENT DOCUMENTS

| | | | | |
|---|---|---|---|---|
| 2023/0308139 | A1* | 9/2023 | Baligh | H04B 7/04013 |
| 2023/0327923 | A1* | 10/2023 | Yapici | H04L 25/03891 |
| 2024/0171447 | A1* | 5/2024 | Hemadeh | H04L 27/36 |
| 2024/0356625 | A1* | 10/2024 | Walker | H04B 7/15528 |
| 2024/0406752 | A1* | 12/2024 | Coskun | H04W 4/02 |

FOREIGN PATENT DOCUMENTS

| | | | |
|---|---|---|---|
| WO | 2022133957 | A1 | 6/2022 |
| WO | 2022226824 | A1 | 11/2022 |
| WO | 2023102892 | A1 | 6/2023 |
| WO | 2023230300 | A1 | 11/2023 |

* cited by examiner

500

1000

BEAM AND SURFACE PARTITION SUBSET SELECTION FOR A MULTI-PARTITIONED RECONFIGURABLE INTELLIGENT SURFACE

FIELD OF THE DISCLOSURE

Aspects of the present disclosure generally relate to wireless communication and to techniques and apparatuses for beam and surface partition subset selection for a multi-partitioned reconfigurable intelligent surface (RIS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a reconfigurable intelligent surface (RIS) device. The method may include receiving a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The method may include activating the first subset of the multiple surface partitions. The method may include deactivating a second subset of the multiple surface partitions, each surface partition in the second subset not being included in the first subset.

Some aspects described herein relate to a method of wireless communication performed by a network node. The method may include transmitting a partition configuration indication that is associated with configuring a surface of a RIS device that includes multiple surface partitions, the partition configuration indication associated with, activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

Some aspects described herein relate to a non-transitory computer-readable medium that stores a set of instructions for wireless communication by a RIS device. The set of instructions, when executed by one or more processors of the RIS, may cause the RIS to receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The set of instructions, when executed by one or more processors of the RIS, may cause the RIS to activate the first subset of the multiple surface partitions. The set of instructions, when executed by one or more processors of the RIS, may cause the RIS to deactivate a second subset of the multiple surface partitions, each surface partition in the second subset not being included in the first subset.

Some aspects described herein relate to a non-transitory computer-readable medium that stores a set of instructions for wireless communication by a network node. The set of instructions, when executed by one or more processors of the network node, may cause the network node to transmit a partition configuration indication that is associated with configuring a surface of a RIS device that includes multiple surface partitions, the partition configuration indication associated with, activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

Some aspects described herein relate to a RIS device for wireless communication. The RIS device may include one or more memories and one or more processors coupled to the one or more memories. The one or more processors may be configured to receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The one or more processors may be configured to activate the first subset of the multiple surface partitions. The one or more processors may be configured to deactivate a second subset of the multiple surface partitions, each surface partition in the second subset not being included in the first subset.

Some aspects described herein relate to a network node for wireless communication. The network node may include one or more memories and one or more processors coupled to the one or more memories. The one or more processors may be configured to transmit a partition configuration indication that is associated with configuring a surface of a RIS device that includes multiple surface partitions, the partition configuration indication associated with, activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

Some aspects described herein relate to an apparatus for wireless communication. The apparatus may include means for receiving a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The apparatus may include means for activating the first subset of the multiple surface partitions. The apparatus may include means for deactivating a second subset of the multiple surface partitions, each surface partition in the second subset not being included in the first subset.

Some aspects described herein relate to an apparatus for wireless communication. The apparatus may include means for transmitting a partition configuration indication that is associated with configuring a surface of a RIS device that includes multiple surface partitions, the partition configuration indication associated with, activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
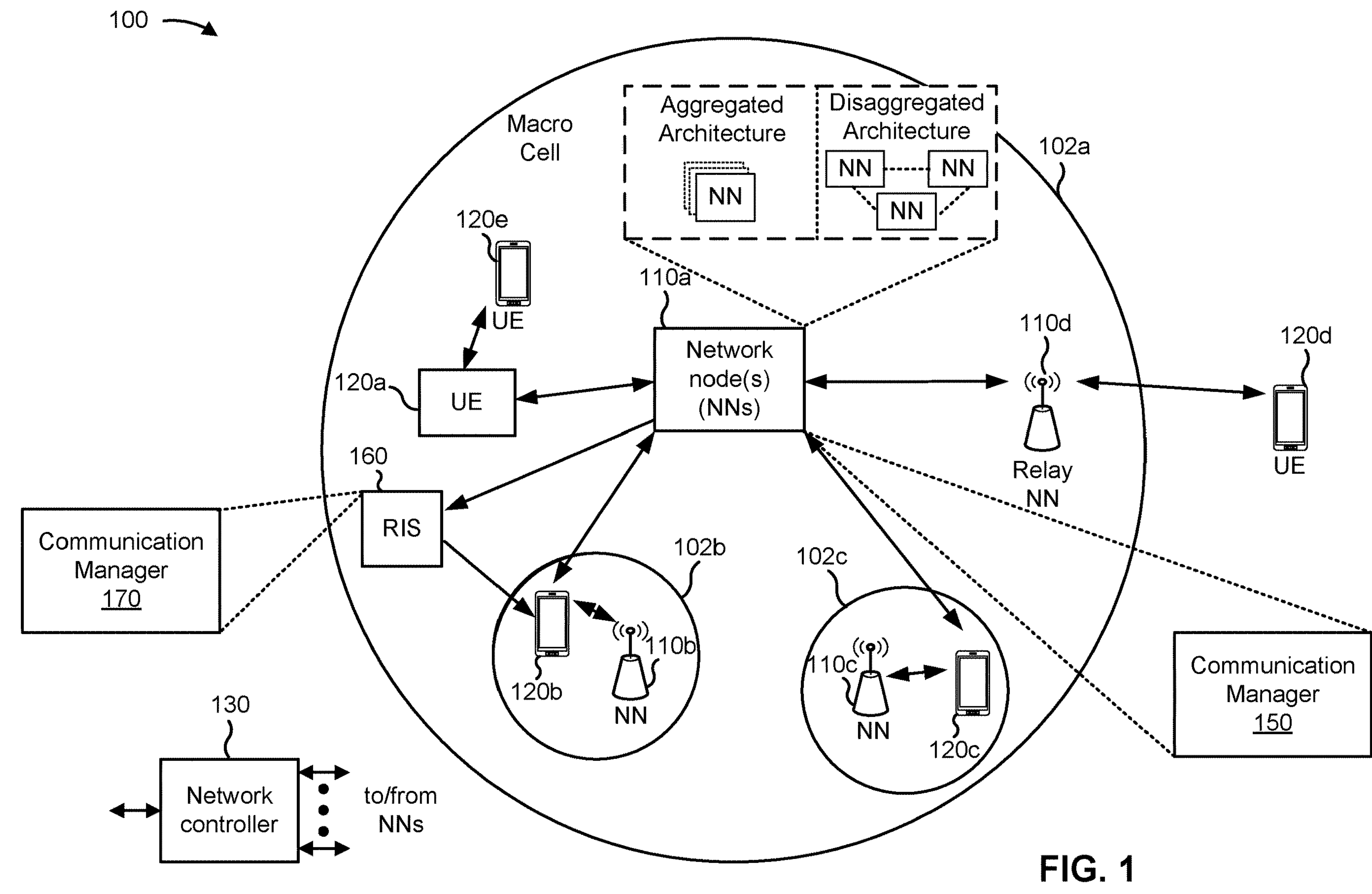
FIG. 1 is a diagram illustrating an example of a wireless network, in accordance with the present disclosure.

Various aspects relate generally to wireless communication and more particularly to reconfigurable intelligent surface (RIS) devices for facilitating wireless communications between network devices. Some aspects more specifically relate to beam and surface partition subset selection for a multi-partitioned RIS. In some examples, a RIS may be partitioned to enable communications using only portions of the RIS surface. Signal quality of communications involving a RIS may vary, for example, based on a location of an active RIS surface partition, a size and shape of the active RIS surface partition, a reference location on the RIS surface used to target the RIS, and interference from inactive RIS surface partitions, among other examples. In some aspects, a RIS may configure a subset of surface partitions, such that a location, shape, and beam associated with an active surface partition may be selected to offer improved signal quality relative to surface partition activation without such considerations. For example, a shape of the active surface partition may be selectively chosen based on a desired power level, and a shape and location of the active surface partition may be used to determine a reference point at the center of the active surface partition, rather than relying on a center of the RIS for beamforming. In some aspects, the RIS may use additional information, such as distance information, to enable beamfocusing (i.e., to focus the beam on the desired receive point instead of steering the beam towards the receive point) for transmission and/or reception beams. The RIS may also be configured to perform dithering of deactivated surface partitions to suppress specular reflection (e.g., mirror-like reflection), in an effort to avoid interference with communications using the active surface partition(s).

Particular aspects of the subject matter described in this disclosure can be implemented to realize one or more of the following potential advantages. In some examples, by selectively activating and deactivating subsets of surface partitions, a RIS may conserve power. In some examples, a shape and location of an active surface partition, as well as the reference point used for targeting transmissions to the RIS, may be configured to produce a stronger signal than might be achieved with other shaped surface partitions in other locations of the RIS surface, and stronger than might be achieved without updating the reference point. Distance information may be used by the RIS to enable beamfocusing, which may also depend on the shape of the surface partition and may be used to further improve signal strength for communications links assisted by the RIS. In some examples, specular reflection (and hence interference) with inactive surface partitions may be mitigated by dithering individual reconfigurable elements of the RIS in inactive surface partitions, which may scatter signals and potentially reduce interference. In this way, the RIS may be configured to improve signal quality for communications with other network devices while taking advantage of power savings offered by the ability to selectively deactivate surface partitions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the RIS 160 may include a communication manager 170. As described in more detail elsewhere herein, the communication manager 170 may receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam; activate the first subset of the multiple surface partitions; and deactivate a second subset of the multiple surface partitions, each surface partition in the second subset not being included in the first subset. Additionally, or alternatively, the communication manager 170 may perform one or more other operations described herein.

In some aspects, the network node 110 may include a communication manager 150. As described in more detail elsewhere herein, the communication manager 150 may transmit a partition configuration indication that is associated with configuring a surface of a RIS device that includes multiple surface partitions, the partition configuration indication associated with: activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions. Additionally, or alternatively, the communication manager 150 may perform one or more other operations described herein.

As indicated above, FIG. 1 is provided as an example. Other examples may differ from what is described with regard to FIG. 1.

Figure 2:
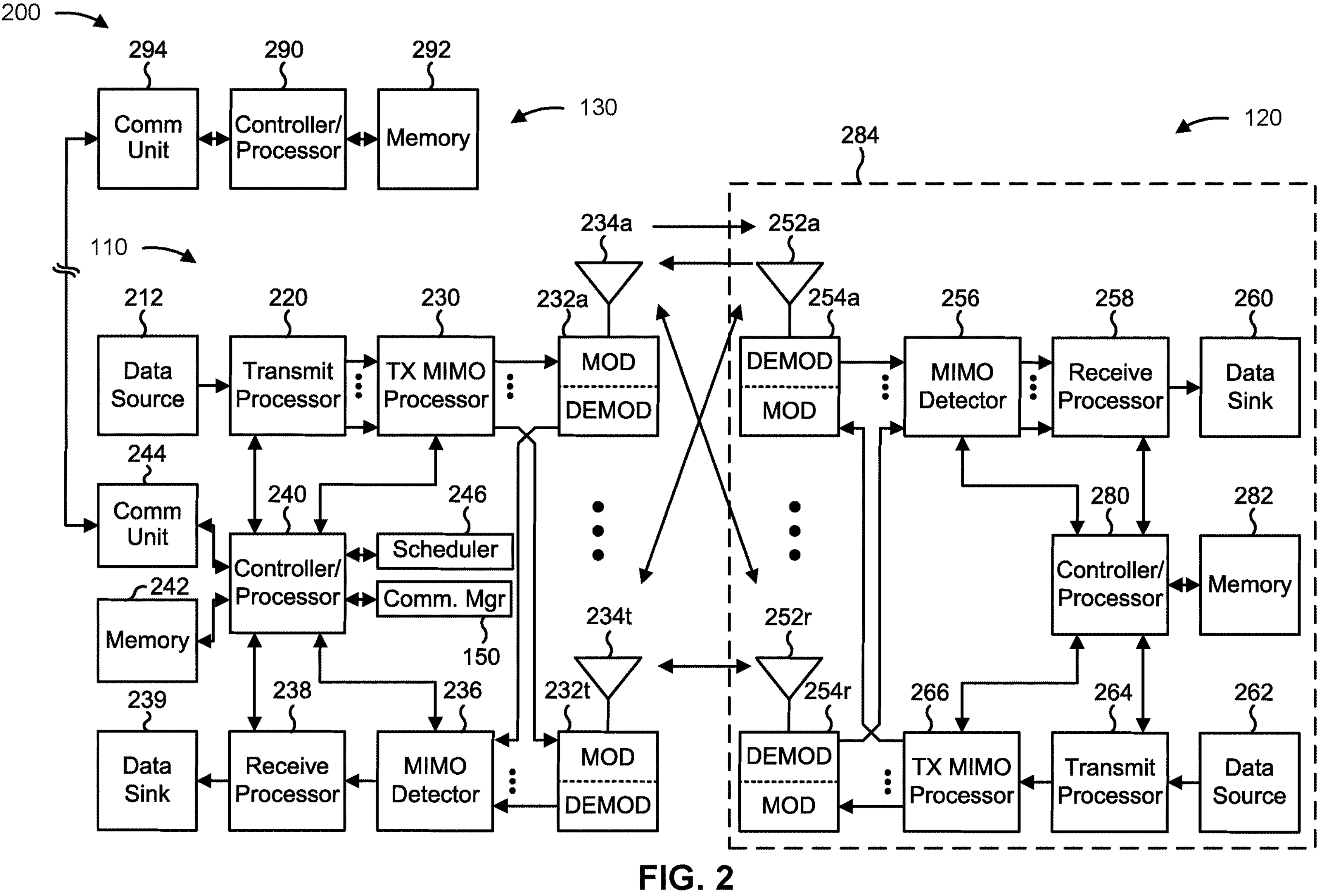
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-13).

The controller/processor 240 of the network node 110, the controller/processor 280 of the UE 120, and/or any other component(s) of FIG. 2 may perform one or more techniques associated with beam and surface partition subset selection for a multi-partitioned reconfigurable intelligent surface, as described in more detail elsewhere herein. In some aspects, the RIS 160 described herein is the UE 120, is included in the UE 120, or includes one or more components of the UE 120 shown in FIG. 2. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the RIS includes means for receiving a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam; means for activating the first subset of the multiple surface partitions; and/or means for deactivating a second subset of the multiple surface partitions, each surface partition in the second subset not being included in the first subset. In some aspects, the means for the RIS to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the RIS to perform operations described herein may include, for example, one or more of communication manager 170, antenna 252, modem 254, MIMO detector 256, receive processor 258, transmit processor 264, TX MIMO processor 266, controller/processor 280, or memory 282.

In some aspects, the network node includes means for transmitting a partition configuration indication that is associated with configuring a surface of a RIS device that includes multiple surface partitions, the partition configuration indication associated with: activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
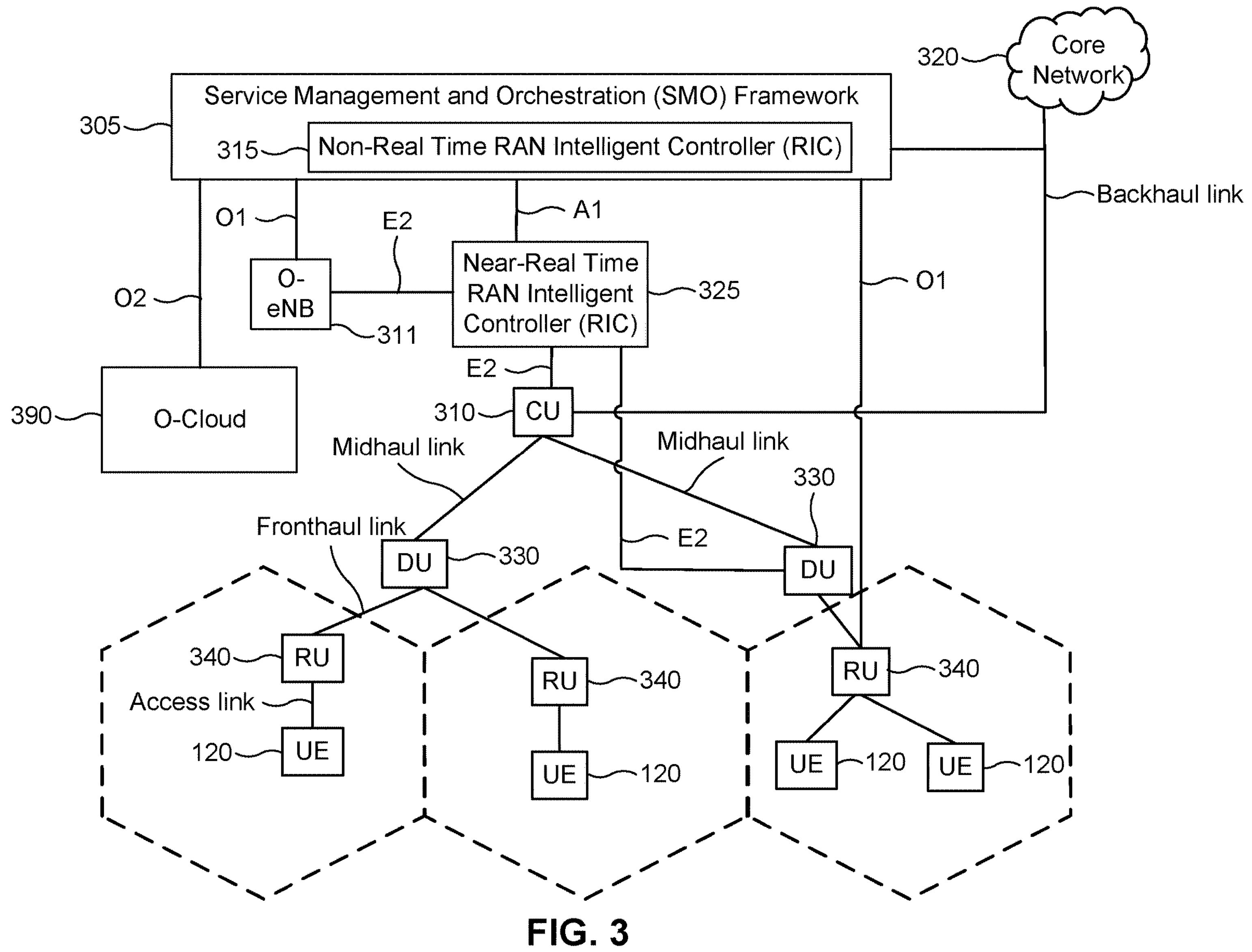
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
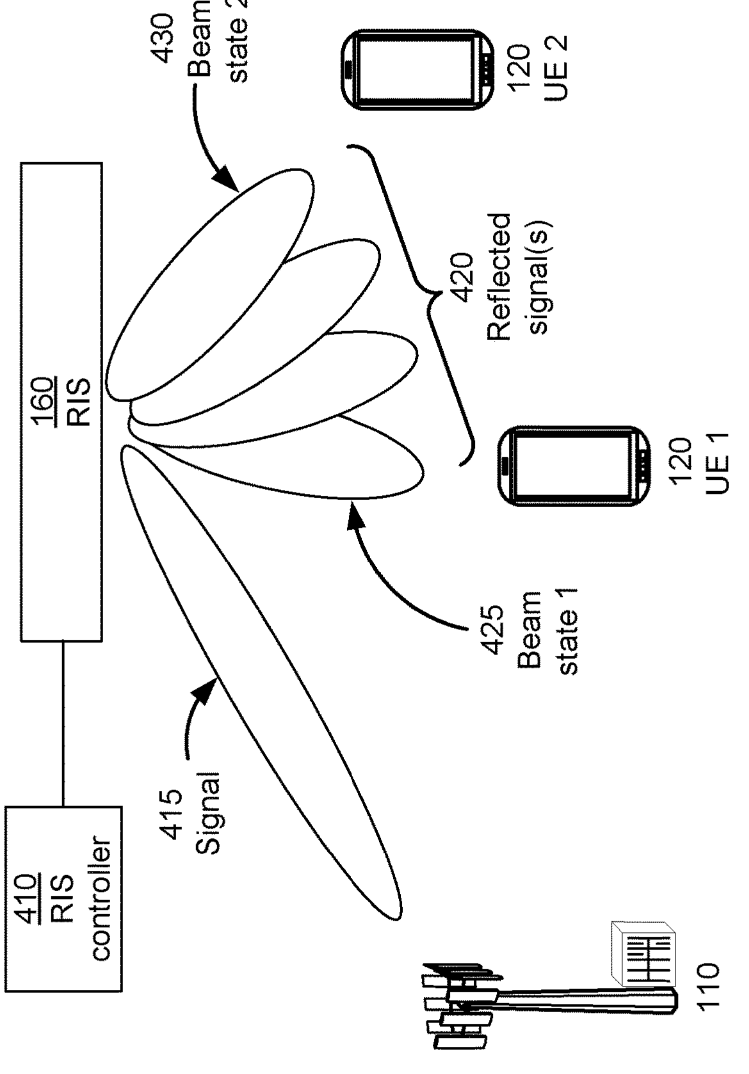
FIG. 4 is a diagram illustrating an example of communications using a reconfigurable intelligent surface (RIS), in accordance with the present disclosure.

FIG. 4 is a diagram illustrating an example 400 of communications using an RIS, in accordance with the present disclosure. As shown in FIG. 4, a network node 110 may communicate with a UE 120 in a wireless network, such as the wireless network 100. The network node 110 and the UE 120 may use the RIS 160 to communicate with one another. For example, the RIS 160 may reflect or redirect a signal to the network node 110 and/or the UE 120. The RIS 160 may also be referred to as an intelligent reflecting surface, intelligent reflection surface, and/or reflective intelligent surface. In some examples, the RIS 160 may be a repeater.

The RIS 160 may be, or may include, a planar or two-dimensional structure or surface that is designed to have properties to enable a dynamic control of signals or electromagnetic waves reflected, refracted, absorbed, and/or redirected by the RIS 160. The RIS 160 may include one or more reconfigurable elements. For example, the RIS 160 may include an array of reconfigurable elements (e.g., an array of uniformly or nonuniformly distributed reconfigurable elements). The reconfigurable elements may be elements with a reconfigurable electromagnetic characteristic. For example, the electromagnetic characteristic may include a reflection characteristic (e.g., a reflection coefficient or phase value), a scattering characteristic, an absorption characteristic, and/or a diffraction characteristic. The electromagnetic characteristic(s) of each reconfigurable element may be independently controlled and changed over time per element or group (of elements) basis. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 160 may be capable of modifying one or more properties (e.g., direction, beam width, phase, amplitude, and/or polarization) of an impinging signal.

The reconfigurable elements of the RIS 160 may be controlled and/or configured by an RIS controller 410. The RIS controller 410 may be a control module (e.g., a controller and/or a processor) that is capable of configuring the electromagnetic characteristic(s) of each reconfigurable element of the RIS 160. The RIS controller 410 may be, or may be included in, the communication manager 170. Alternatively, the communication manager 170 may be included in the RIS controller 410. The RIS controller 410 may be associated with certain components similar to the components described in connection with the UE 120 in connection with FIG. 2, such as a modem 254 and/or a similar component for purposes of communicating with a network node 110. The RIS controller 410 may receive control communications (e.g., from a network node 110 and/or a UE 120) indicating one or more properties of reflected signals (e.g., indicating a desired direction, a desired beam width, a desired phase, a desired amplitude, and/or a desired polarization). Therefore, in some examples, the RIS 160 may be capable of receiving communications (e.g., via the RIS 160 and/or the RIS controller 410). In some examples, the RIS 160 and/or the RIS controller 410 may not have transmit capabilities (e.g., the RIS 160 may be capable of reflecting and/or redirecting impinging signals via the reconfigurable elements but may not be capable of generating and/or transmitting signals). Alternatively, in some examples, the RIS 160 and/or the RIS controller 410 may have transmit capabilities (e.g., the RIS 160 may be capable of reflecting and/or redirecting impinging signals via the reconfigurable elements and may be capable of generating and/or transmitting signals). For example, the RIS 160 and/or the RIS controller 410 may include one or more antennas and/or antenna elements for receiving and/or transmitting signals.

For example, as shown in FIG. 4, the network node 110 may transmit a signal 415. The signal 415 may be transmitted in a spatial direction toward the RIS 160. The RIS 160 may configure the reconfigurable elements of the RIS 160 to reflect and/or redirect the signal 415 in a desired spatial direction and/or with one or more desired signal characteristics (e.g., beam width, phase, amplitude, frequency, and/or polarization). For example, as shown by reference number 420, the RIS 160 may be capable of reflecting the signal 415 in one or more spatial directions. Although multiple beams are shown in FIG. 4 representing different beam states or beam directions of the RIS 160, the RIS 160 may be capable of reflecting a signal with one beam state or one beam direction at a time. For example, in one case, as shown by reference number 425, the RIS 160 may be configured to reflect the signal 415 using a first beam state (e.g., beam state 1). "Beam state" may refer to a spatial direction and/or a beam of a reflected signal (e.g., a signal reflected by the RIS 160). The first beam state may cause the signal 415 to be reflected in a spatial direction toward a first UE 120 (e.g., UE 1). As shown by reference number 430, in another case, the RIS 160 may be configured to reflect the signal 415 using a second beam state (e.g., beam state 2). The second beam state may cause the signal 415 to be reflected in a spatial direction toward a second UE 120 (e.g., UE 2).

The RIS 160 may be deployed in a wireless network (such as the wireless network 100) to improve communication performance and efficiency. For example, the RIS 160 may enable a transmitter (e.g., a network node 110 or a UE 120) to control the scattering, reflection, and refraction characteristics of signals transmitted by the transmitter, to overcome the negative effects of wireless propagation. For example, the RIS 160 may effectively control signal characteristics (e.g., spatial direction, beam width, phase, amplitude, frequency, and/or polarization) of an impinging signal without a need for complex decoding, encoding, and radio frequency processing operations. Therefore, the RIS 160 may provide increased channel diversity for propagation of signals in a wireless network. The increased channel diversity provides robustness to channel fading and/or blocking, such as when higher frequencies are used by the network node 110 and/or the UE 120 (e.g., millimeter wave frequencies and/or sub-terahertz frequencies). Moreover, as the RIS 160 does not need to perform complex decoding, encoding, and radio frequency processing operations, the RIS 160 may provide a more cost and energy efficient manner of reflecting and/or redirecting signals in a wireless network (e.g., as compared to other mechanisms for reflecting and/or redirecting signals, such as a relay device).

As indicated above, FIG. 4 is provided as an example. Other examples may differ from what is described with respect to FIG. 4.

Figure 5:
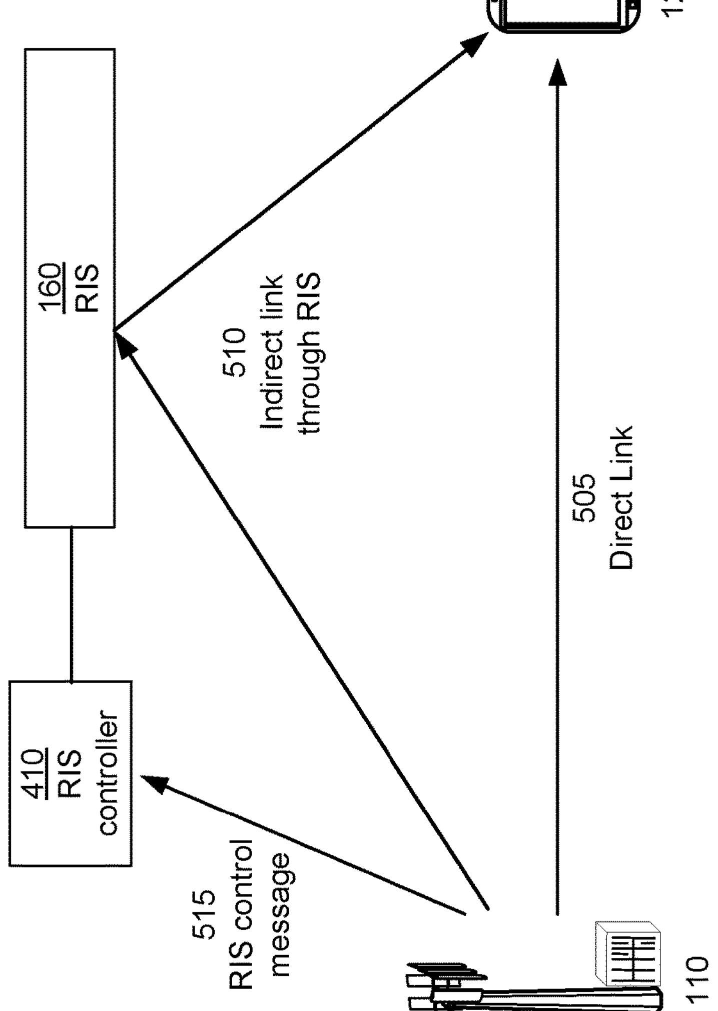
FIG. 5 is a diagram illustrating an example of communication links in a wireless network that includes an RIS, in accordance with the present disclosure.

FIG. 5 is a diagram illustrating an example 500 of communication links in a wireless network that includes an RIS, in accordance with the present disclosure. As shown, example 500 includes a network node 110, a UE 120, and the RIS 160. The RIS 160 may be controlled and/or configured by the RIS controller 410.

As shown in FIG. 5, the UE 120 may receive a communication (e.g., data and/or control information) directly from the network node 110 as a downlink communication. Additionally, or alternatively, the UE 120 may receive a communication (e.g., data and/or control information) indirectly from the network node 110 via the RIS 160. For example, the network node 110 may transmit the communication in a spatial direction toward the RIS 160, and the RIS 160 may redirect or reflect the communication to the UE 120.

In some examples, the UE 120 may communicate directly with the network node 110 via a direct link 505. For example, a communication may be transmitted via the direct link 505. A communication transmitted via the direct link 505 between the UE 120 and the network node 110 does not pass through and is not reflected or redirected by the RIS 160. In some examples, the UE 120 may communicate indirectly with the network node 110 via an indirect link 510. For example, a communication may be transmitted via different segments of the indirect link 510. A communication transmitted via the indirect link 510 between the UE 120 and the network node 110 is reflected and/or redirected by the RIS 160. As shown in FIG. 5 and by reference number 515, the network node 110 may communicate with the RIS 160 (e.g., with the RIS controller 410) via a control channel. For example, the network node 110 may indicate, in an RIS control message, spatial direction(s) and/or signal characteristics for signals reflected by the RIS 160. The RIS controller 410 may configure reconfigurable elements of the RIS 160 in accordance with the RIS control message. In some examples, the RIS control message may indicate information associated with the wireless network, such as a frame structure, time synchronization information, and/or slot boundaries, among other examples. Using the communication scheme shown in FIG. 5 may improve network performance and increase reliability by providing the UE 120 with link diversity for communicating with the network node 110.

In some cases, the UE 120 may receive a communication (e.g., the same communication) from the network node 110 via both the direct link 505 and the indirect link 510. In other cases, the network node 110 may select one of the links (e.g., either the direct link 505 or the indirect link 510) and may transmit a communication to the UE 120 using only the selected link. Alternatively, the network node 110 may receive an indication of one of the links (e.g., either the direct link 505 or the indirect link 510) and may transmit a communication to the UE 120 using only the indicated link. The indication may be transmitted by the UE 120 and/or the RIS 160. In some examples, such selection and/or indication may be based at least in part on channel conditions and/or link reliability.

As indicated above, FIG. 5 is provided as an example. Other examples may differ from what is described with respect to FIG. 5.

Figure 6:
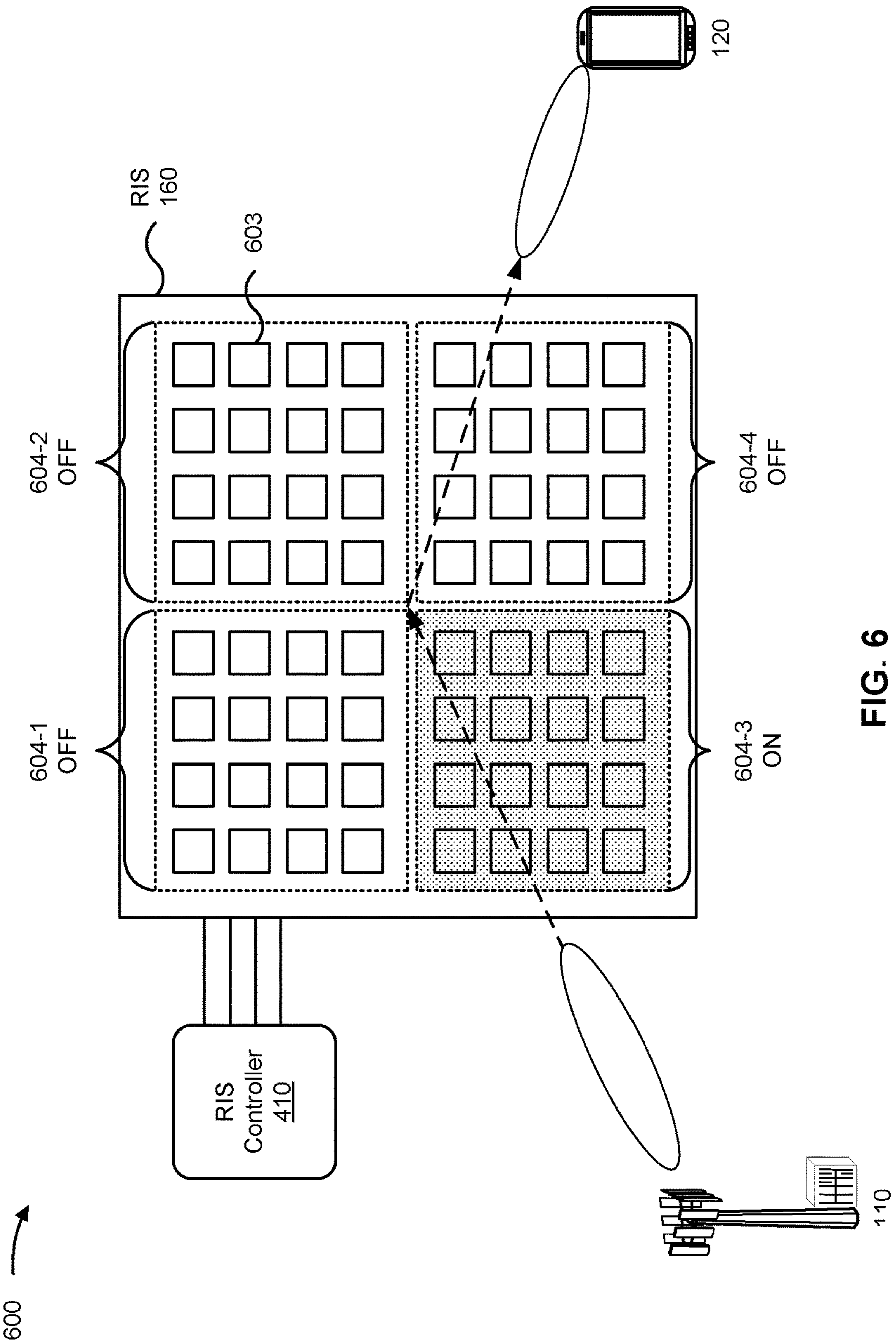
FIG. 6 is a diagram illustrating an example of multiple surface partitions of a RIS, in accordance with the present disclosure.

FIG. 6 is a diagram illustrating an example 600 of multiple surface partitions of a RIS, in accordance with the present disclosure. As shown in FIG. 6, a network node 110 and a UE 120 may communicate with one another via a RIS 160.

The RIS 160 may include a number of reconfigurable elements, such as reconfigurable element 603 (sometimes referred to as scattering elements or reflective elements). Reconfigurable elements 603 may be grouped into surface partitions 604, such as surface partitions 604-1, 604-2, 604-3, and 604-4, and the surface partitions 604 may be selectively activated, deactivated, or otherwise configured to enable joint encoding and beamforming at the RIS 160. Partitioning the reconfigurable elements into a number of surface partitions may reduce a complexity of control wiring at the RIS 160, because the group of reconfigurable elements may be controlled together. Additionally, or alternatively, partitioning the reconfigurable elements into a number of surface partitions may reduce power consumption at the RIS 160, because certain surface partitions may be turned off to lower power requirements. However, switching off some surface partitions of the RIS 160 may lead to a lower beamforming gain, which may result in QoS problems on the scheduled UEs 120 or other network entities receiving the reflected beam.

As shown in example 600, the RIS controller 410 has deactivated surface partitions 604-1, 604-2, and 604-4, using active surface partition 604-3 for communications with UE 120. Often, and as shown in example 600, the center of the RIS 160 is the reference point of the RIS 160 used for communications. In this situation, the network node 110 directs a transmit beam at the center of RIS 160, even when the center of the RIS 160 is not the center of the active portion of the RIS 160. The difference between the reference point being at the center of the RIS 160, as opposed to a location closer to the center of the active surface partition 604-3, may lead to interference from other reconfigurable elements 603 and/or suboptimal beam selection by the network node 110, RIS 160, and/or UE 120, which may degrade communications between the network node 110 and UE 120.

As indicated above, FIG. 6 is provided as an example. Other examples may differ from what is described with respect to FIG. 6.

Some techniques and apparatuses described herein enable a RIS to configure a subset of multiple surface partitions, such that a location, shape, and beam associated with an active surface partition may be selected to offer improved signal quality relative to surface partition activation without such considerations. For example, a shape of the active surface partition may be selectively chosen based on a desired power level, a shape and location of the active surface partition may be used to determine a reference point at the center of the active surface partition, rather than relying on a center of the RIS for beamforming, and a beam used by the RIS may also be configured based on the location and shape of the active surface partition. In some aspects, the RIS may use additional information, such as distance information, to enable beamfocusing for transmission and/or reception beams. As a result, a RIS may be configured to use an active surface partition associated with a size, shape, location, and/or beam configured to improve communications between the RIS and other network devices. In this way, the RIS may be configured to improve signal quality for communications with other network devices while taking advantage of power savings offered by the ability to selectively deactivate surface partitions.

Figure 7:
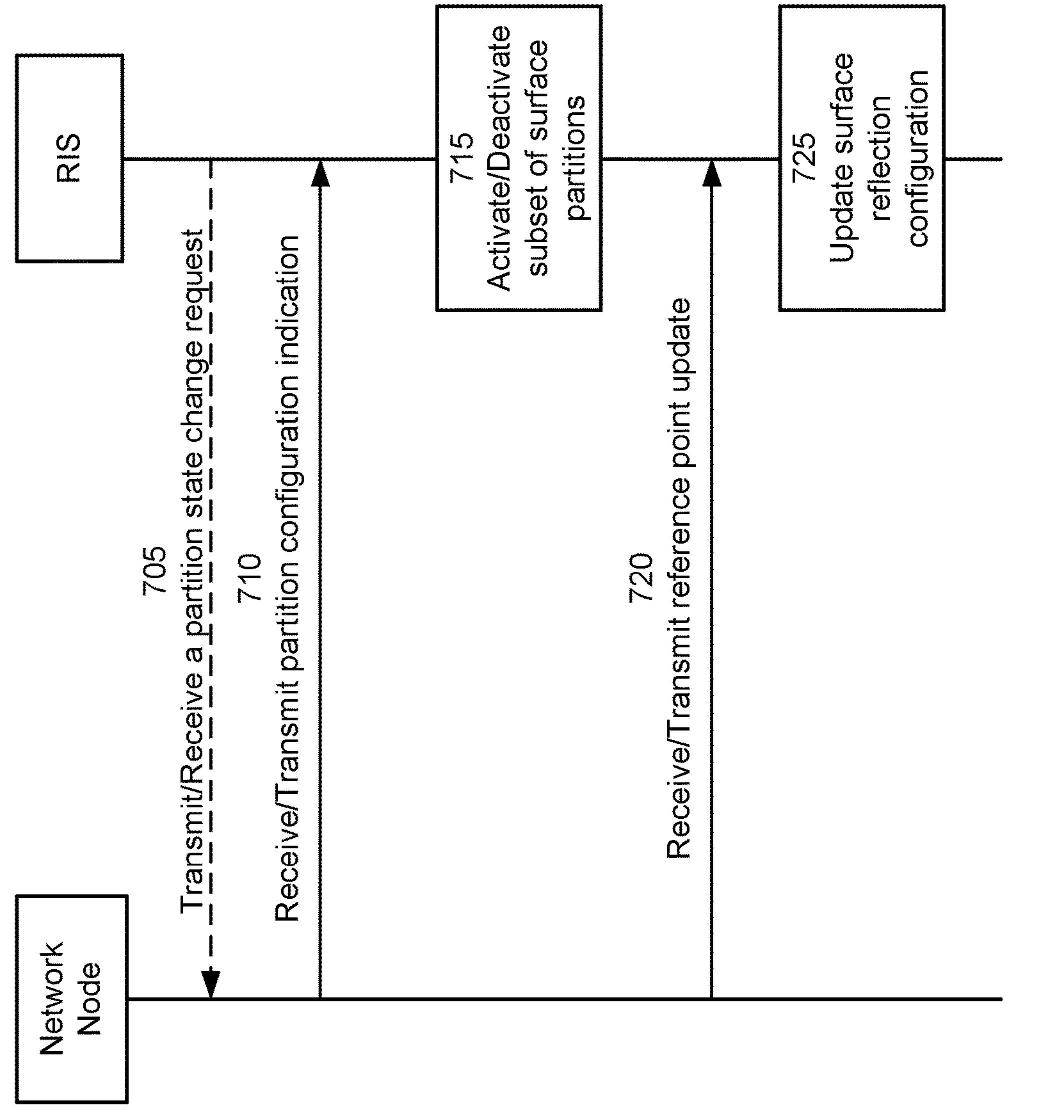
FIG. 7 is a diagram of an example associated with beam and surface partition subset selection for a multi-partitioned RIS, in accordance with the present disclosure.

FIG. 7 is a diagram of an example 700 associated with beam and surface partition subset selection for a multi-partitioned RIS, in accordance with the present disclosure. As shown in FIG. 7, a network node (e.g., network node 110) may communicate with a RIS (e.g., RIS 160). In some aspects, the network node and the RIS may be part of a wireless network (e.g., wireless network 100). In some aspects, actions described as being performed by the network node may be performed by multiple different network nodes. For example, configuration actions may be performed by a first network node (e.g., a CU and/or a DU), and radio communication actions may be performed by a second network node (e.g., a DU and/or an RU). The RIS and the network node may have established a wired or wireless connection prior to operations shown in FIG. 7. The RIS may be associated with a partition state, such as a default, baseline, or current partition state, which may define the location, shape, beam, reconfigurable elements, and/or the like, of the active surface partition(s).

As shown by reference number 705, the RIS may transmit, and the network node may receive, a partition state change request. The partition state change request may be associated with changing an operating state of at least one of the surface partitions of the RIS. For example, the RIS may transmit the partition state change request to cause the network node to provide a partition configuration, so that the RIS may change the operating state of (e.g., activate or deactivate) one or more of the surface partitions.

In some aspects, the partition state change request may include information to facilitate determining the partition configuration of the RIS. For example, the partition state change request may indicate the active subset of the surface partitions of the RIS, one or more inoperative surface partitions and/or reconfigurable elements, a power level threshold, and/or the like. In some aspects the RIS may transmit the partition state change request based at least in part on detecting one or more triggering events. For example, the triggering event(s) may include detecting an inoperative surface partition of the multiple surface partitions, and/or a power level satisfying an energy saving mode threshold, among other examples. This may enable the RIS to request a change in configuration if, for example, the RIS detects a fault in a surface partition, and/or if energy savings are desired (or no longer needed) by the RIS.

As shown by reference number 710, the network node may transmit, and the RIS may receive, a partition configuration indication that is associated with configuring the surface of the RIS. The partition configuration information may be associated with activation and/or deactivation of a subset of the surface partitions of the RIS. The subset of surface partitions may be based at least in part on a location of the first subset on the surface, a geometric shape formed by the first subset, and a beam associated with the first subset, as described herein. For example, the location and/or geometric shape may be selected based at least in part on an effect that a combination of the location and the geometric shape have on a power level of the beam used by the RIS for transmitting and/or receiving communications to and from the network node and/or a UE.

The shape and location of the surface partition may have an effect on received power of a RIS transmission, whether the RIS is using beamforming (e.g., based on an angle to the target) and/or beamfocusing (e.g., based on and angle and distance to the target). With respect to beamforming, for example, assuming the total aperture size of the surface partition is the same (e.g., the surface area and number of active reconfigurable elements remains the same), a symmetric subsurface (e.g., a square-shape, such as a 25 cm×25 cm) centered on the RIS surface often results in the highest received power for UEs in the near-field region (e.g., up to 18 meters away from the RIS). A horizontal subsurface (e.g., a rectangular shape, such as a 50 cm×12.5 cm) centered on the RIS surface often results in the highest received power for UEs at a longer range (e.g., more than 18 meters away from the RIS). A vertical subsurface (e.g., a rectangular shape, such as a 12.5 cm×50 cm) centered on the RIS surface often results in the lowest received power for UEs at any distance. With respect to beamfocusing, for example, the symmetric subsurface often results in the highest received power (relative to other configurations), while the vertical subsurface often results in the lowest received power (relative to other configurations). In this way, the shape and location of the surface partition may affect the power level of the beam used by the RIS, as certain configurations are likely to perform better under certain conditions, as described herein.

In some aspects, the network node may calculate or determine which subset of the RIS surface partitions are to be activated and/or deactivated and provide the associated configuration information with the partition configuration indication. In some aspects, partition configuration information may be used by the RIS to enable the RIS to calculate or determine which subset of the RIS surface partitions are to be activated and/or deactivated.

In some aspects, the RIS may calculate or determine that beamfocusing the beam increases a power level of the beam relative to beamforming the beam. For example, this may be determined based at least in part on the shape and location of the subset of surface partitions to be used, the distance to the target device (e.g., a UE), and preconfigured logic indicating when beamfocusing is to be used. In general, beamfocusing—which takes distance to the target into account—results in a beam power level at least as high as beamforming, and often outperforms beamforming, depending on the distance to the target. In some aspects, the RIS may select the subset of surface partitions based at least in part on a beamfocusing configuration that is associated with a distance from the RIS device to an intended recipient device. In some aspects, the RIS may receive an indication of the distance to the intended recipient, and the indication of the distance may be provided based at least in part on the RIS transmitting, to the network node and/or the intended recipient, a request for the distance.

In some aspects, the RIS may select a number of surface partitions to include in the subset of surface partitions (e.g., for activation and/or deactivation) based at least in part on power consumption by the RIS device. For example, the RIS may be operating with a limited power consumption based on available power or other constraints, which may limit the number of surface partitions that can be active. In some aspects, the RIS may include an indication of the number in the partition state change request. For example, based on power consumption limitations, the RIS may transmit the partition state change request and include, with the request, an indication of how many surface partitions may be activated while still meeting a power threshold.

As described herein, in some aspects, the RIS may select the subset of surface partitions to be activated and/or deactivated. In this situation, the RIS may transmit, to the network node, the partition state change request with an indication of which surface partitions are included in the subset. In some aspects, the selection may be based at least in part on power consumption of the RIS, as described herein.

In some aspects, the partition configuration indication may include an instruction to reconfigure a respective surface reflection configuration of one or more surface partitions of the subset of surface partitions based at least in part on the beam. For example, reconfiguring the respective surface reflection configuration may cause the RIS to change the beam being used, change characteristics of the beam (e.g., phase configuration), and/or the like, in an effort to avoid RF link failure (e.g., due to insufficient power) and/or avoid degradation of communications.

As shown by reference number 715, the RIS may activate the subset of surface partitions and/or deactivate another subset of the surface partitions. The subset to be deactivated does not include any surface partitions that are included in the subset to be activated.

In some aspects, to deactivate surface partitions, the RIS may select a respective soft-off configuration for each surface partition to be deactivated and apply the respective soft-off configuration to each surface partition to be deactivated. For example, rather than simply turning off surface partitions, which may create a smooth mirror that may inject strong specular interference, a soft-off configuration may enable the RIS to adjust individual reconfigurable elements to be oriented differently (e.g., randomly) to avoid the un-used surface partitions from acting as a smooth mirror.

In some aspects, the RIS may transmit, and the network node may receive, an indication of a soft-off dithering capability. The soft-off dithering capability is the capability for the RIS to adjust individual reconfigurable elements of a surface partition to avoid a smooth mirror. For example, the RIS may provide a soft-off dithering capability that may be defined as, for each surface partition, for a given set of incident directions, the maximal ratio of reflected power and incident power over all reflected directions or over all directions deemed safe to inject interference. The soft-off dithering capability may be defined per operating frequency band and/or per polarization. In some aspects, the soft-off configuration may be based at least in part on a reflected signal suppression value. For example, the network node may indicate, for each surface partition, a required reflected signal suppression value and/or frequency-dependent safe directions to reflect signals. The RIS may use the soft-off dithering capability and network node requirements to choose an optimized dither state for the surface partition to be deactivated.

In some aspects, the soft-off dithering may be pre-determined, or pseudo-random. Signals incident on the dithered surface partition will be diffusely scattered, rather than producing a strong specular reflection in a single direction, which may reduce interference with the desired communications with the active subset of surface partitions.

As shown by reference number 720, the network node may transmit, and the RIS may receive, an indication of an updated reference point. For example, the reference point may refer to the direction in which a beam is to be targeted. As described herein, the reference point may refer to the center of the RIS surface by default. In some aspects, the reference point may be shifted to improve signal quality, for example, by shifting the reference point to a center of the active subset of surface partitions. For example, if one quadrant of the RIS is active, and all other quadrants are deactivated, the reference point may be updated to the center of the active quadrant to provide a better target for the network node and/or the UE. In some aspects, the updated reference point may be provided using coordinates of the RIS surface.

As shown by reference number 725, the RIS may update a surface reflection configuration for at least one surface partition based at least in part on the updated reference point. For example, the surface reflection configuration may be updated with a suitable phase configuration for future communication using the updated reference point.

In some aspects, the RIS may receive a distance indication associated with a focal point that is associated with the updated reference point, and the surface reflection configuration may be updated based at least in part on the distance information. In some aspects, the RIS may calculate a propagation direction based at least in part on the distance indication and the updated reference point, and update the surface reflection configuration based at least in part on the propagation direction and beamforming the beam. In some aspects, the RIS may receive a second distance indication associated with a second focal point associated with the updated reference point, and the RIS may update the surface reflection configuration based at least in part on the propagation direction and beamfocusing the beam based at least in part on the second distance indication.

Updating the surface reflection configuration may enable the RIS device to further improve signal quality by accounting for a shift in a center of the active surface partition. As a result, the RIS may be configured to use an active surface partition associated with a size, shape, location, and/or beam configured to improve communications between the RIS and other network devices. In this way, the RIS may be configured to improve signal quality for communications with other network devices while taking advantage of power savings offered by the ability to selectively deactivate surface partitions.

As indicated above, FIG. 7 is provided as an example. Other examples may differ from what is described with respect to FIG. 7. For example, while various actions are described as being performed by the network node, in some aspects, the RIS may perform these actions instead. Similarly, the network node may perform some actions that are described as being performed by the RIS.

Figure 8:
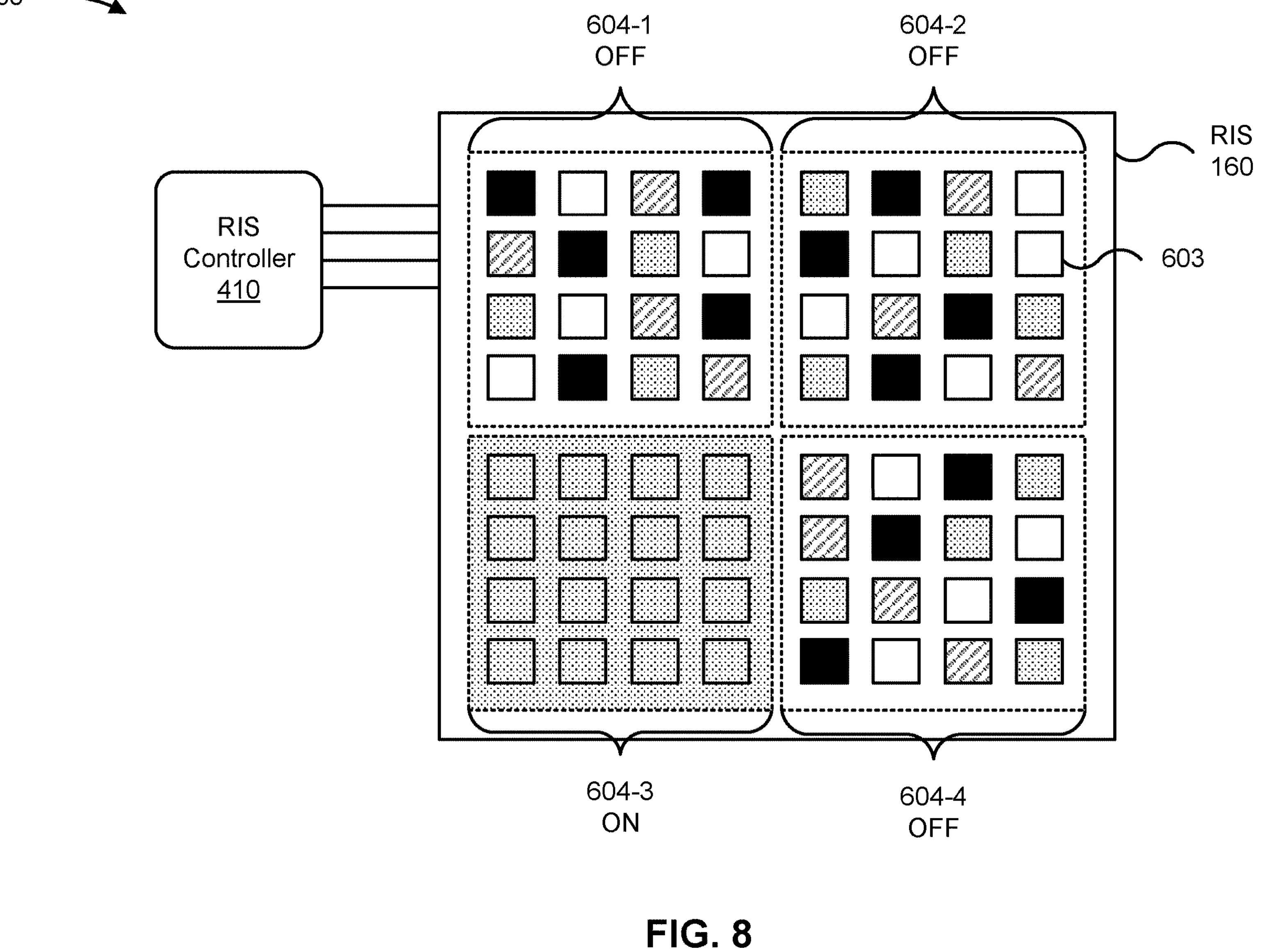
FIG. 8 is a diagram illustrating an example of soft-off dithering, in accordance with the present disclosure.

FIG. 8 is a diagram illustrating an example 800 of soft-off dithering, in accordance with the present disclosure. As shown in FIG. 8, a network node 110 and a UE 120 may communicate with one another via a RIS 160.

As shown in example 800, the surface partitions that have been deactivated (e.g., 604-1, 604-2, and 604-4) have also been dithered, as represented by different fill for different reconfigurable elements 603. As described herein, the dithering diffusely scatters incident signal, rather than causing a specular reflection in a single direction.

As indicated above, FIG. 8 is provided as an example. Other examples may differ from what is described with respect to FIG. 8.

Figure 9:
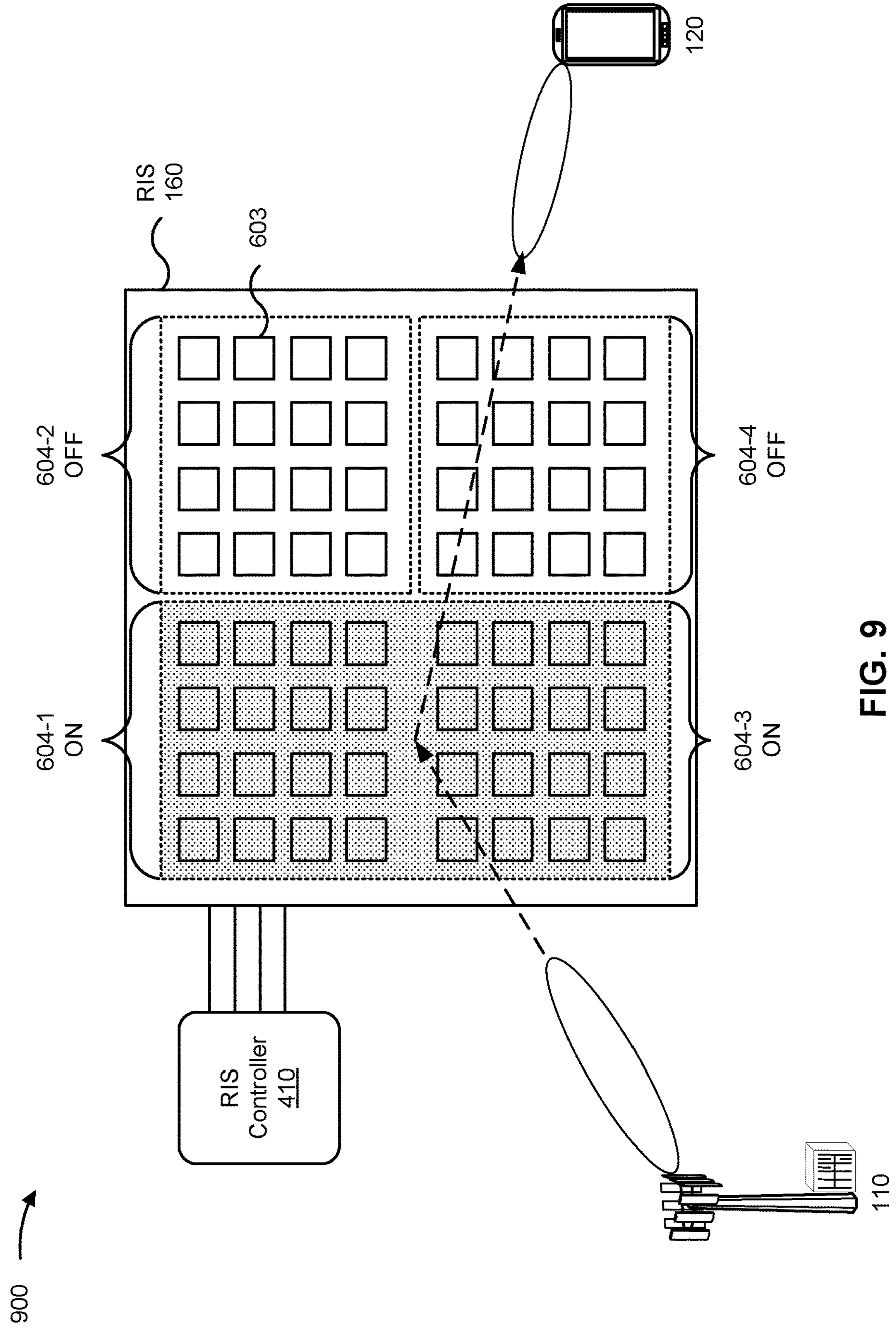
FIG. 9 is a diagram illustrating an example of an off-center RIS reference point, in accordance with the present disclosure.

FIG. 9 is a diagram illustrating an example 900 of an off-center RIS reference point, in accordance with the present disclosure. As shown in FIG. 9, a network node 110 and a UE 120 may communicate with one another via a RIS 160.

As shown in example 900, the reference point of the RIS 160 has been shifted from a center of the RIS surface to a center of the active subset of surface partitions, 604-1 and 604-3. By shifting the reference point to the center of the active subset, the RIS may improve signal quality of communications between the RIS 160 and the network node 110, and the RIS 160 and the UE 120.

As indicated above, FIG. 9 is provided as an example. Other examples may differ from what is described with respect to FIG. 9.

Figure 10:
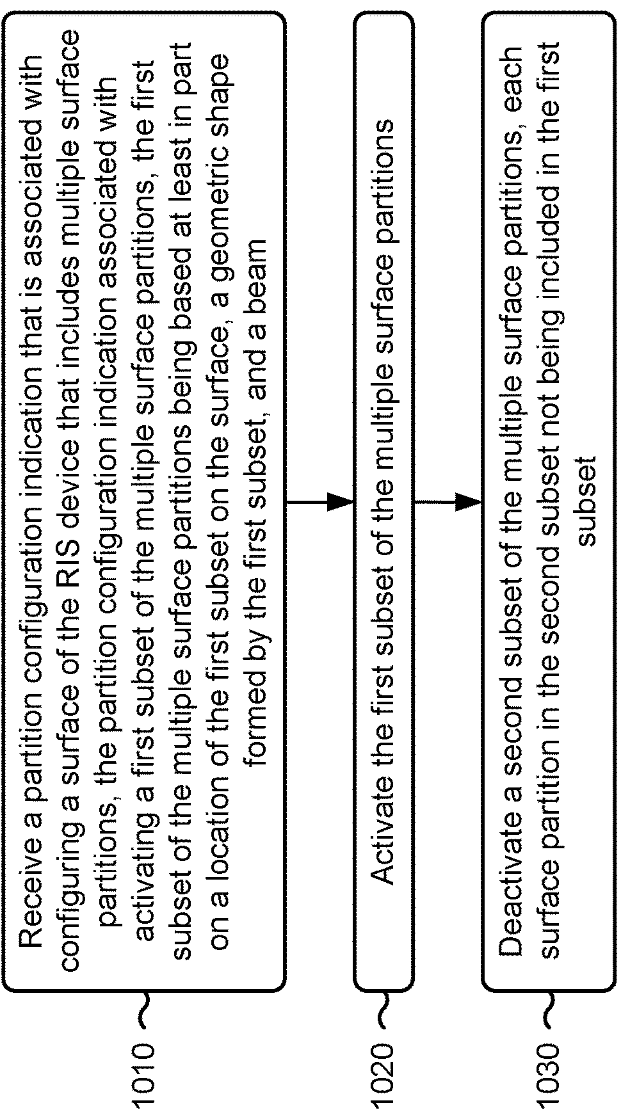
FIG. 10 is a diagram illustrating an example process performed, for example, by a RIS device, in accordance with the present disclosure.

FIG. 10 is a diagram illustrating an example process 1000 performed, for example, by a RIS device, in accordance with the present disclosure. Example process 1000 is an example where the RIS device (e.g., RIS 160) performs operations associated with beam and surface partition subset selection for a multi-partitioned reconfigurable intelligent surface.

As shown in FIG. 10, in some aspects, process 1000 may include receiving a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam (block 1010). For example, the RIS device (e.g., using reception component 1202 and/or communication manager 1206, depicted in FIG. 12) may receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam, as described above.

As further shown in FIG. 10, in some aspects, process 1000 may include activating the first subset of the multiple surface partitions (block 1020). For example, the RIS device (e.g., using communication manager 1206, depicted in FIG. 12) may activate the first subset of the multiple surface partitions, as described above.

As further shown in FIG. 10, in some aspects, process 1000 may include deactivating a second subset of the multiple surface partitions, each surface partition in the second subset not being included in the first subset (block 1030). For example, the RIS device (e.g., using communication manager 1206, depicted in FIG. 12) may deactivate a second subset of the multiple surface partitions, each surface partition in the second subset not being included in the first subset, as described above.

Process 1000 may include additional aspects, such as any single aspect or any combination of aspects described below and/or in connection with one or more other processes described elsewhere herein.

In a first aspect, process 1000 includes transmitting a partition state change request that is associated with changing an operating state of at least one surface partition of the multiple surface partitions, wherein receiving the partition configuration indication is based at least in part on transmitting the partition state change request.

In a second aspect, alone or in combination with the first aspect, the partition state change request indicates the at least one surface partition.

In a third aspect, alone or in combination with one or more of the first and second aspects, process 1000 includes detecting a partition change trigger event, wherein transmitting the partition state change request is based at least in part on detecting the partition change trigger event.

In a fourth aspect, alone or in combination with one or more of the first through third aspects, the partition change trigger event comprises at least one of detecting an inoperative surface partition of the multiple surface partitions, or a power level satisfying an energy saving mode threshold.

In a fifth aspect, alone or in combination with one or more of the first through fourth aspects, receiving the partition configuration indication comprises receiving, as at least part of the partition configuration indication, an instruction to reconfigure a respective surface reflection configuration of one or more surface partitions of the first subset of the multiple surface partitions based at least in part on the beam.

In a sixth aspect, alone or in combination with one or more of the first through fifth aspects, the partition configuration indication specifies the first subset of the multiple surface partitions.

In a seventh aspect, alone or in combination with one or more of the first through sixth aspects, process 1000 includes calculating that beamfocusing the beam increases a power level of the beam relative to beamforming the beam, and selecting the first subset of the multiple surface partitions based at least in part on a beamfocusing configuration that is associated with a distance from the RIS device to an intended recipient device.

In an eighth aspect, alone or in combination with one or more of the first through seventh aspects, process 1000 includes receiving an indication of the distance.

In a ninth aspect, alone or in combination with one or more of the first through eighth aspects, process 1000 includes transmitting a request for the distance, wherein receiving the indication of the distance comprises receiving the indication of the distance as a response to the request.

In a tenth aspect, alone or in combination with one or more of the first through ninth aspects, process 1000 includes selecting the location of the first subset and the geometric shape of the first subset based at least in part on an effect that a combination of the location and the geometric shape have on a power level of the beam.

In an eleventh aspect, alone or in combination with one or more of the first through tenth aspects, process 1000 includes selecting the location of the first subset and the geometric shape of the first subset based at least in part on power consumption by the RIS device.

In a twelfth aspect, alone or in combination with one or more of the first through eleventh aspects, process 1000 includes selecting a number of the multiple surface partitions to include in the first subset of the multiple surface partitions based at least in part on power consumption by the RIS device.

In a thirteenth aspect, alone or in combination with one or more of the first through twelfth aspects, process 1000 includes transmitting, to a network node, a partition state change request that indicates the number, and receiving an indication of the first subset of the multiple surface partitions, wherein the first subset of multiple partitions is based at least in part on the number.

In a fourteenth aspect, alone or in combination with one or more of the first through thirteenth aspects, process 1000 includes selecting the first subset of the multiple surface partitions based at least in part on the number.

In a fifteenth aspect, alone or in combination with one or more of the first through fourteenth aspects, process 1000 includes transmitting, to a network node, a partition state change request that indicates the first subset of the multiple surface partitions.

In a sixteenth aspect, alone or in combination with one or more of the first through fifteenth aspects, deactivating the second subset of the multiple surface partitions comprises selecting a respective soft-off configuration for each surface partition of the second subset of the multiple surface partitions, and applying the respective soft-off configuration to each surface partition of the second subset of the multiple surface partitions.

In a seventeenth aspect, alone or in combination with one or more of the first through sixteenth aspects, selecting the respective soft-off configuration comprises selecting the respective soft-off configuration based at least in part on reflected signal suppression.

In an eighteenth aspect, alone or in combination with one or more of the first through seventeenth aspects, process 1000 includes transmitting an indication of a soft-off dithering capability, and receiving an instruction to deactivate each surface partition of the second subset of the multiple surface partitions based at least in part on using soft-off deactivation.

In a nineteenth aspect, alone or in combination with one or more of the first through eighteenth aspects, process 1000 includes receiving an indication of an updated reference point, and updating a surface reflection configuration for at least one surface partition of the first subset of the multiple surface partitions based at least in part on the updated reference point.

In a twentieth aspect, alone or in combination with one or more of the first through nineteenth aspects, process 1000 includes receiving a distance indication that is associated with a focal point that is associated with the updated reference point, wherein updating the surface reflection configuration comprises updating the surface reflection configuration for the at least one surface partition of the first subset of the multiple surface partitions based at least in part on the distance indication and the updated reference point.

In a twenty-first aspect, alone or in combination with one or more of the first through twentieth aspects, process 1000 includes calculating a propagation direction based at least in part on the distance indication and the updated reference point, wherein updating the surface reflection configuration comprises updating the surface reflection configuration for the at least one surface partition based at least in part on the propagation direction and beamforming the beam.

In a twenty-second aspect, alone or in combination with one or more of the first through twenty-first aspects, the distance indication is a first distance indication, wherein the focal point is a first focal point, and the method further comprises receiving a second distance indication that is associated with a second focal point associated with the updated reference point, and calculating a propagation direction based at least in part on the first distance indication and the updated reference point, wherein updating the surface reflection configuration comprises updating the surface reflection configuration based at least in part on the propagation direction and beamfocusing the beam based at least in part on the second distance indication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
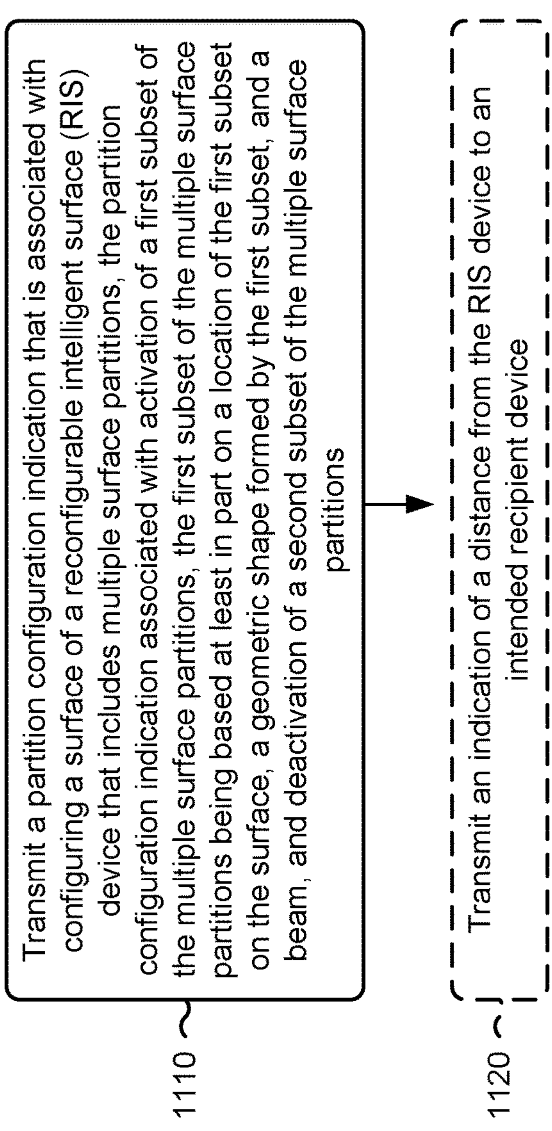
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with beam and surface partition subset selection for a multi-partitioned reconfigurable intelligent surface.

As shown in FIG. 11, in some aspects, process 1100 may include transmitting a partition configuration indication that is associated with configuring a surface of a RIS device that includes multiple surface partitions, the partition configuration indication associated with: activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions (block 1110). For example, the network node (e.g., using transmission component 1304 and/or communication manager 1306, depicted in FIG. 11) may transmit a partition configuration indication that is associated with configuring a surface of a RIS device that includes multiple surface partitions, the partition configuration indication associated with: activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions, as described above.

Process 1100 may include additional aspects, such as any single aspect or any combination of aspects described below and/or in connection with one or more other processes described elsewhere herein.

In a first aspect, process 1100 includes receiving a partition state change request that is associated with changing an operating state of at least one surface partition of the multiple surface partitions, wherein transmitting the partition configuration indication is based at least in part on receiving the partition state change request.

In a second aspect, alone or in combination with the first aspect, the partition state change request indicates the at least one surface partition.

In a third aspect, alone or in combination with one or more of the first and second aspects, transmitting the partition configuration indication comprises transmitting, as at least part of the partition configuration indication, an instruction to reconfigure a respective surface reflection configuration of one or more surface partitions of the first subset of the multiple surface partitions based at least in part on the beam.

In a fourth aspect, alone or in combination with one or more of the first through third aspects, the partition configuration indication specifies the first subset of the multiple surface partitions.

In a fifth aspect, alone or in combination with one or more of the first through fourth aspects, process 1100 includes calculating that beamfocusing the beam increases a power level of the beam relative to beamforming the beam, and selecting the first subset of the multiple surface partitions based at least in part on a distance from the RIS device to an intended recipient device.

In a sixth aspect, alone or in combination with one or more of the first through fifth aspects, process 1100 includes transmitting an indication of a distance from the RIS device to an intended recipient device (block 1120). For example, the network node device (e.g., using communication manager 1306, depicted in FIG. 13) may transmit an indication of a distance from the RIS device to an intended recipient device.

In a seventh aspect, alone or in combination with one or more of the first through sixth aspects, process 1100 includes receiving a request for the distance, wherein transmitting the indication of the distance comprises transmitting the indication of the distance as a response to the request.

In an eighth aspect, alone or in combination with one or more of the first through seventh aspects, process 1100 includes selecting the location of the first subset and the geometric shape of the first subset based at least in part on an effect that a combination of the location and the geometric shape have on a power level of the beam.

In a ninth aspect, alone or in combination with one or more of the first through eighth aspects, process 1100 includes selecting the location of the first subset and the geometric shape of the first subset based at least in part on power consumption by the RIS device.

In a tenth aspect, alone or in combination with one or more of the first through ninth aspects, process 1100 includes receiving a partition state change request that indicates a number of the multiple surface partitions to include in the first subset of the multiple surface partitions, and transmitting an indication of the first subset of the multiple surface partitions, wherein the first subset of multiple partitions is based at least in part on the number.

In an eleventh aspect, alone or in combination with one or more of the first through tenth aspects, process 1100 includes selecting the first subset of the multiple surface partitions based at least in part on the number.

In a twelfth aspect, alone or in combination with one or more of the first through eleventh aspects, process 1100 includes receiving a partition state change request that indicates the first subset of the multiple surface partitions.

In a thirteenth aspect, alone or in combination with one or more of the first through twelfth aspects, process 1100 includes receiving an indication of a soft-off dithering capability, and transmitting an instruction to deactivate each surface partition of the second subset of the multiple surface partitions based at least in part on using soft-off deactivation.

In a fourteenth aspect, alone or in combination with one or more of the first through thirteenth aspects, process 1100 includes transmitting an indication of an updated reference point that is based at least in part on the first subset of the multiple surface partitions.

In a fifteenth aspect, alone or in combination with one or more of the first through fourteenth aspects, process 1100 includes transmitting a distance indication that is associated with a focal point that is associated with the updated reference point and a propagation direction for beamforming.

In a sixteenth aspect, alone or in combination with one or more of the first through fifteenth aspects, the distance indication is a first distance indication, wherein the focal point is a first focal point, and the method further comprises transmitting a second distance indication that is associated with a second focal point that is associated with the updated reference point and a target location for beamfocusing.

In a seventeenth aspect, alone or in combination with one or more of the first through sixteenth aspects, process 1100 includes detecting an update trigger event, wherein transmitting the partition configuration indication is based at least in part on detecting the update trigger event.

In an eighteenth aspect, alone or in combination with one or more of the first through seventeenth aspects, the update trigger event comprises at least one of a link quality metric failing to satisfy a quality threshold, or the link quality metric satisfying an energy mode threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
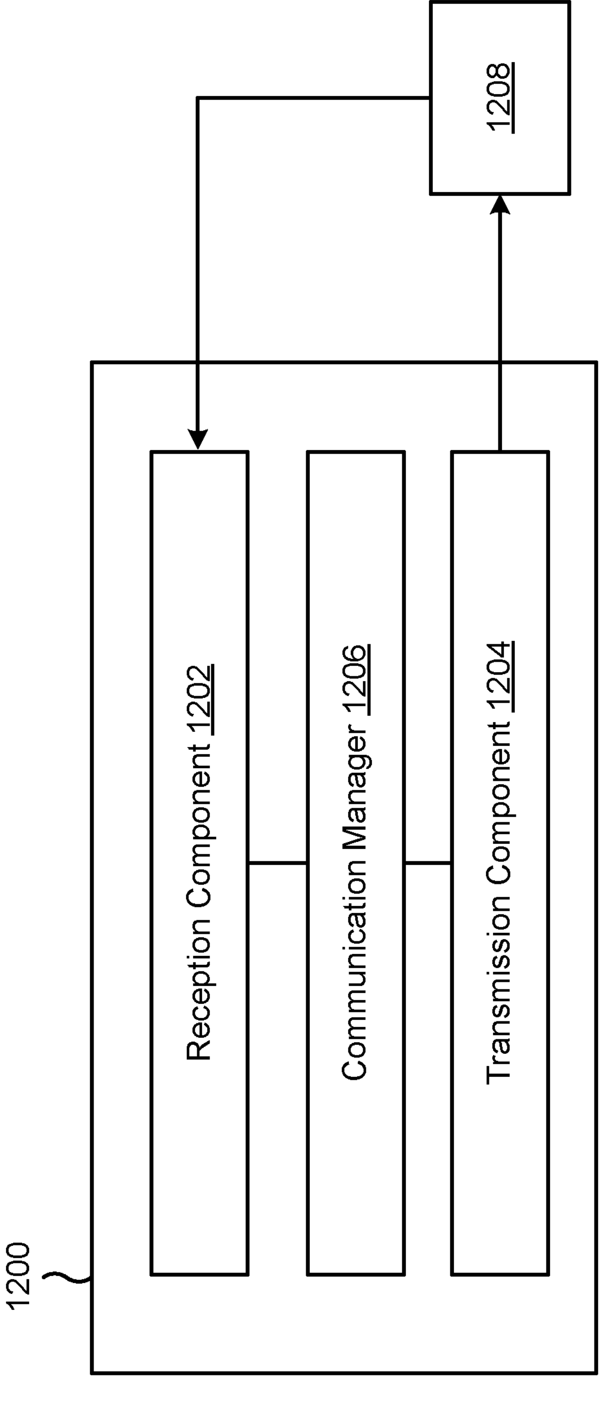
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a RIS, or a RIS may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 170 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the RIS described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the RIS described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the RIS described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam. The communication manager 1206 may activate the first subset of the multiple surface partitions. The communication manager 1206 may deactivate a second subset of the multiple surface partitions, each surface partition in the second subset not being included in the first subset.

The transmission component 1204 may transmit a partition state change request that is associated with changing an operating state of at least one surface partition of the multiple surface partitions wherein receiving the partition configuration indication is based at least in part on transmitting the partition state change request.

The communication manager 1206 may detect a partition change trigger event wherein transmitting the partition state change request is based at least in part on detecting the partition change trigger event.

The communication manager 1206 may calculate that beamfocusing the beam increases a power level of the beam relative to beamforming the beam.

The communication manager 1206 may select the first subset of the multiple surface partitions based at least in part on a beamfocusing configuration that is associated with a distance from the RIS device to an intended recipient device.

The reception component 1202 may receive an indication of the distance.

The transmission component 1204 may transmit a request for the distance.

The communication manager 1206 may select the location of the first subset and the geometric shape of the first subset based at least in part on an effect that a combination of the location and the geometric shape have on a power level of the beam.

The communication manager 1206 may select the location of the first subset and the geometric shape of the first subset based at least in part on power consumption by the RIS device.

The communication manager 1206 may select a number of the multiple surface partitions to include in the first subset of the multiple surface partitions based at least in part on power consumption by the RIS device.

The transmission component 1204 may transmit, to a network node, a partition state change request that indicates the number.

The reception component 1202 may receive an indication of the first subset of the multiple surface partitions, wherein the first subset of multiple partitions is based at least in part on the number.

The communication manager 1206 may select the first subset of the multiple surface partitions based at least in part on the number.

The transmission component 1204 may transmit, to a network node, a partition state change request that indicates the first subset of the multiple surface partitions.

The transmission component 1204 may transmit an indication of a soft-off dithering capability.

The reception component 1202 may receive an instruction to deactivate each surface partition of the second subset of the multiple surface partitions based at least in part on using soft-off deactivation.

The reception component 1202 may receive an indication of an updated reference point.

The communication manager 1206 may update a surface reflection configuration for at least one surface partition of the first subset of the multiple surface partitions based at least in part on the updated reference point.

The reception component 1202 may receive a distance indication that is associated with a focal point that is associated with the updated reference point.

The communication manager 1206 may calculate a propagation direction based at least in part on the distance indication and the updated reference point.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
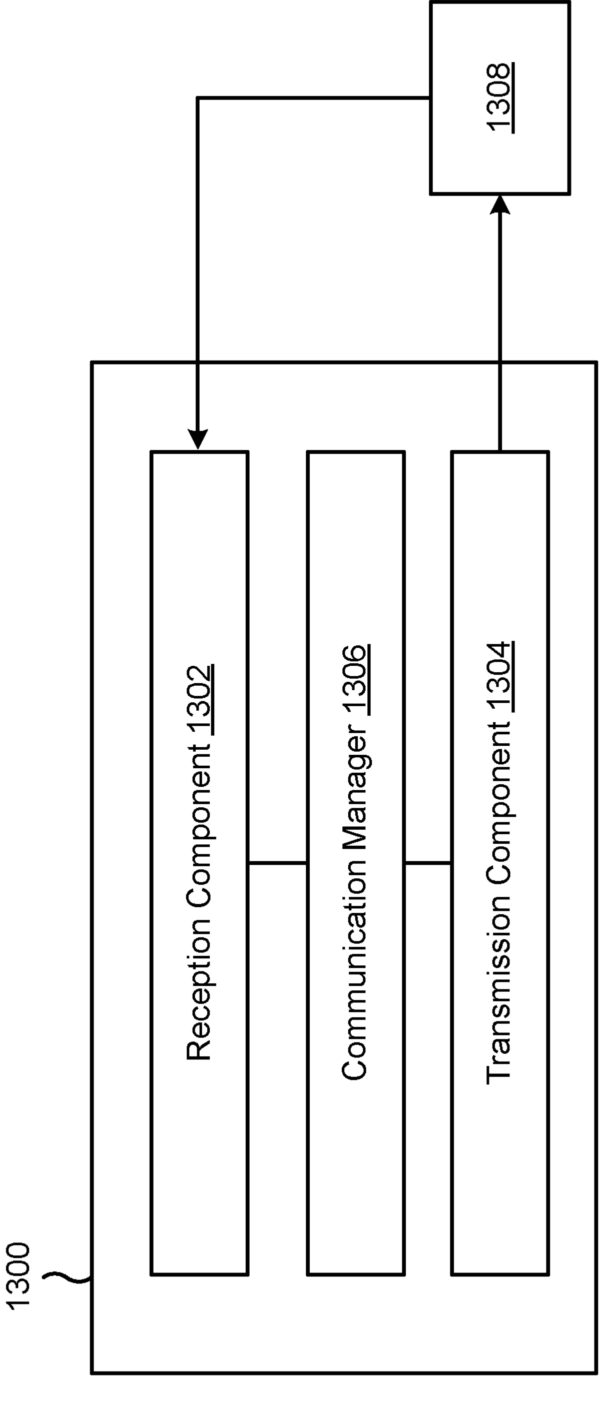
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit a partition configuration indication that is associated with configuring a surface of a RIS device that includes multiple surface partitions, the partition configuration indication associated with activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

The reception component 1302 may receive a partition state change request that is associated with changing an operating state of at least one surface partition of the multiple surface partitions wherein transmitting the partition configuration indication is based at least in part on receiving the partition state change request.

The communication manager 1306 may calculate that beamfocusing the beam increases a power level of the beam relative to beamforming the beam.

The communication manager 1306 may select the first subset of the multiple surface partitions based at least in part on a distance from the RIS device to an intended recipient device.

The transmission component 1304 may transmit an indication of a distance from the RIS device to an intended recipient device.

The reception component 1302 may receive a request for the distance.

The communication manager 1306 may select the location of the first subset and the geometric shape of the first subset based at least in part on an effect that a combination of the location and the geometric shape have on a power level of the beam.

The communication manager 1306 may select the location of the first subset and the geometric shape of the first subset based at least in part on power consumption by the RIS device.

The reception component 1302 may receive a partition state change request that indicates a number of the multiple surface partitions to include in the first subset of the multiple surface partitions.

The transmission component 1304 may transmit an indication of the first subset of the multiple surface partitions, wherein the first subset of multiple partitions is based at least in part on the number.

The communication manager 1306 may select the first subset of the multiple surface partitions based at least in part on the number.

The reception component 1302 may receive a partition state change request that indicates the first subset of the multiple surface partitions.

The reception component 1302 may receive an indication of a soft-off dithering capability.

The transmission component 1304 may transmit an instruction to deactivate each surface partition of the second subset of the multiple surface partitions based at least in part on using soft-off deactivation.

The transmission component 1304 may transmit an indication of an updated reference point that is based at least in part on the first subset of the multiple surface partitions.

The transmission component 1304 may transmit a distance indication that is associated with a focal point that is associated with the updated reference point and a propagation direction for beamforming.

The communication manager 1306 may detect an update trigger event wherein transmitting the partition configuration indication is based at least in part on detecting the update trigger event.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a RIS device, comprising: receiving a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam; activating the first subset of the multiple surface partitions; and deactivating a second subset of the multiple surface partitions, each surface partition in the second subset not being included in the first subset.

Aspect 2: The method of Aspect 1, further comprising: transmitting a partition state change request that is associated with changing an operating state of at least one surface partition of the multiple surface partitions, wherein receiving the partition configuration indication is based at least in part on transmitting the partition state change request.

Aspect 3: The method of Aspect 2, wherein the partition state change request indicates the at least one surface partition.

Aspect 4: The method of Aspect 2, further comprising: detecting a partition change trigger event, wherein transmitting the partition state change request is based at least in part on detecting the partition change trigger event.

Aspect 5: The method of Aspect 4, wherein the partition change trigger event comprises at least one of: detecting an inoperative surface partition of the multiple surface partitions, or a power level satisfying an energy saving mode threshold.

Aspect 6: The method of any of Aspects 1-5, wherein receiving the partition configuration indication comprises receiving, as at least part of the partition configuration indication, an instruction to reconfigure a respective surface reflection configuration of one or more surface partitions of the first subset of the multiple surface partitions based at least in part on the beam.

Aspect 7: The method of Aspect 6, wherein the partition configuration indication specifies the first subset of the multiple surface partitions.

Aspect 8: The method of Aspect 6, further comprising: calculating that beamfocusing the beam increases a power level of the beam relative to beamforming the beam; and selecting the first subset of the multiple surface partitions based at least in part on a beamfocusing configuration that is associated with a distance from the RIS device to an intended recipient device.

Aspect 9: The method of Aspect 8, further comprising: receiving an indication of the distance.

Aspect 10: The method of Aspect 9, further comprising: transmitting a request for the distance, wherein receiving the indication of the distance comprises receiving the indication of the distance as a response to the request.

Aspect 11: The method of any of Aspects 1-10, further comprising: selecting the location of the first subset and the geometric shape of the first subset based at least in part on an effect that a combination of the location and the geometric shape have on a power level of the beam.

Aspect 12: The method of Aspect 10, further comprising: selecting the location of the first subset and the geometric shape of the first subset based at least in part on power consumption by the RIS device.

Aspect 13: The method of any of Aspects 1-12, further comprising: selecting a number of the multiple surface partitions to include in the first subset of the multiple surface partitions based at least in part on power consumption by the RIS device.

Aspect 14: The method of Aspect 13, further comprising: transmitting, to a network node, a partition state change request that indicates the number; and receiving an indication of the first subset of the multiple surface partitions, wherein the first subset of multiple partitions is based at least in part on the number.

Aspect 15: The method of Aspect 13, further comprising: selecting the first subset of the multiple surface partitions based at least in part on the number.

Aspect 16: The method of Aspect 15, further comprising: transmitting, to a network node, a partition state change request that indicates the first subset of the multiple surface partitions.

Aspect 17: The method of any of Aspects 1-16, wherein deactivating the second subset of the multiple surface partitions comprises selecting a respective soft-off configuration for each surface partition of the second subset of the multiple surface partitions; and applying the respective soft-off configuration to each surface partition of the second subset of the multiple surface partitions.

Aspect 18: The method of Aspect 17, wherein selecting the respective soft-off configuration comprises selecting the respective soft-off configuration based at least in part on reflected signal suppression.

Aspect 19: The method of Aspect 17, further comprising: transmitting an indication of a soft-off dithering capability; and receiving an instruction to deactivate each surface partition of the second subset of the multiple surface partitions based at least in part on using soft-off deactivation.

Aspect 20: The method of any of Aspects 1-19, further comprising: receiving an indication of an updated reference point; and updating a surface reflection configuration for at least one surface partition of the first subset of the multiple surface partitions based at least in part on the updated reference point.

Aspect 21: The method of Aspect 20, further comprising: receiving a distance indication that is associated with a focal point that is associated with the updated reference point, wherein updating the surface reflection configuration comprises updating the surface reflection configuration for the at least one surface partition of the first subset of the multiple surface partitions based at least in part on the distance indication and the updated reference point, and updating the surface reflection configuration comprises updating the surface reflection configuration for the at least one surface partition of the first subset of the multiple surface partitions based at least in part on the distance indication and the updated reference point.

Aspect 22: The method of Aspect 21, further comprising: calculating a propagation direction based at least in part on the distance indication and the updated reference point, wherein updating the surface reflection configuration comprises updating the surface reflection configuration for the at least one surface partition based at least in part on the propagation direction and beamforming the beam.

Aspect 23: The method of Aspect 21, wherein the distance indication is a first distance indication, wherein the focal point is a first focal point, and the method further comprises: receiving a second distance indication that is associated with a second focal point associated with the updated reference point; and calculating a propagation direction based at least in part on the first distance indication and the updated reference point, wherein updating the surface reflection configuration comprises updating the surface reflection configuration based at least in part on the propagation direction and beamfocusing the beam based at least in part on the second distance indication.

Aspect 24: A method of wireless communication performed by a network node, comprising: transmitting a partition configuration indication that is associated with configuring a surface of a reconfigurable intelligent surface (RIS) device that includes multiple surface partitions, the partition configuration indication associated with: activation of a first subset of the multiple surface partitions, the first subset of the multiple surface partitions being based at least in part on a location of the first subset on the surface, a geometric shape formed by the first subset, and a beam, and deactivation of a second subset of the multiple surface partitions.

Aspect 25: The method of Aspect 24, further comprising: receiving a partition state change request that is associated with changing an operating state of at least one surface partition of the multiple surface partitions, wherein transmitting the partition configuration indication is based at least in part on receiving the partition state change request.

Aspect 26: The method of Aspect 25, wherein the partition state change request indicates the at least one surface partition.

Aspect 27: The method of any of Aspects 24-26, wherein transmitting the partition configuration indication comprises transmitting, as at least part of the partition configuration indication, an instruction to reconfigure a respective surface reflection configuration of one or more surface partitions of the first subset of the multiple surface partitions based at least in part on the beam.

Aspect 28: The method of Aspect 27, wherein the partition configuration indication specifies the first subset of the multiple surface partitions.

Aspect 29: The method of Aspect 27, further comprising: calculating that beamfocusing the beam increases a power level of the beam relative to beamforming the beam; and selecting the first subset of the multiple surface partitions based at least in part on a distance from the RIS device to an intended recipient device.

Aspect 30: The method of any of Aspects 24-29, further comprising: transmitting an indication of a distance from the RIS device to an intended recipient device.

Aspect 31: The method of Aspect 30, further comprising: receiving a request for the distance, wherein transmitting the indication of the distance comprises transmitting the indication of the distance as a response to the request.

Aspect 32: The method of any of Aspects 24-31, further comprising: selecting the location of the first subset and the geometric shape of the first subset based at least in part on an effect that a combination of the location and the geometric shape have on a power level of the beam.

Aspect 33: The method of any of Aspects 24-32, further comprising: selecting the location of the first subset and the geometric shape of the first subset based at least in part on power consumption by the RIS device.

Aspect 34: The method of any of Aspects 24-33, further comprising: receiving a partition state change request that indicates a number of the multiple surface partitions to include in the first subset of the multiple surface partitions; and transmitting an indication of the first subset of the multiple surface partitions, wherein the first subset of multiple partitions is based at least in part on the number.

Aspect 35: The method of Aspect 34, further comprising: selecting the first subset of the multiple surface partitions based at least in part on the number.

Aspect 36: The method of any of Aspects 24-35, further comprising: receiving a partition state change request that indicates the first subset of the multiple surface partitions.

Aspect 37: The method of any of Aspects 24-36, further comprising: receiving an indication of a soft-off dithering capability; and transmitting an instruction to deactivate each surface partition of the second subset of the multiple surface partitions based at least in part on using soft-off deactivation.

Aspect 38: The method of any of Aspects 24-37, further comprising: transmitting an indication of an updated reference point that is based at least in part on the first subset of the multiple surface partitions.

Aspect 39: The method of Aspect 38, further comprising: transmitting a distance indication that is associated with a focal point that is associated with the updated reference point and a propagation direction for beamforming.

Aspect 40: The method of Aspect 39, wherein the distance indication is a first distance indication, wherein the focal point is a first focal point, and the method further comprises: transmitting a second distance indication that is associated with a second focal point that is associated with the updated reference point and a target location for beamfocusing.

Aspect 41: The method of any of Aspects 24-40, further comprising: detecting an update trigger event, wherein transmitting the partition configuration indication is based at least in part on detecting the update trigger event.

Aspect 42: The method of Aspect 41, wherein the update trigger event comprises at least one of: a link quality metric failing to satisfy a quality threshold, or the link quality metric satisfying an energy mode threshold.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A reconfigurable intelligent surface (RIS) device for wireless communication, comprising:

one or more memories; and one or more processors, coupled to the one or more memories, configured to:

transmit a partition state change request, wherein the transmission of the partition state change request is based at least in part on a detection of a partition change trigger event;

receive, based at least in part on the transmission of the partition state change request, a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam;

activate the first subset of the multiple surface partitions; and deactivate a second subset of the multiple surface partitions, each surface partition in the second subset not being included in the first subset.

2. The RIS device of claim 1, wherein the partition state change request is associated with changing an operating state of at least one surface partition of the multiple surface partitions.

3. The RIS device of claim 2, wherein the partition state change request indicates the at least one surface partition.

4. The RIS device of claim 1, wherein the one or more processors are further configured to:

detect the partition change trigger event.

5. The RIS device of claim 1, wherein the partition change trigger event comprises at least one of:

detecting an inoperative surface partition of the multiple surface partitions, or a power level satisfying an energy saving mode threshold.

6. The RIS device of claim 1, wherein the one or more processors, to receive the partition configuration indication, are configured to:

receive, as at least part of the partition configuration indication, an instruction to reconfigure a respective surface reflection configuration of one or more surface partitions of the first subset of the multiple surface partitions based at least in part on the beam.

7. The RIS device of claim 6, wherein the partition configuration indication specifies the first subset of the multiple surface partitions.

8. The RIS device of claim 6, wherein a selection of the first subset of the multiple surface partitions is based at least in part on a beamfocusing configuration that is associated with a distance from the RIS device to an intended recipient device, wherein beamfocusing the beam increases a power level of the beam relative to beamforming the beam.

9. The RIS device of claim 8, wherein the one or more processors are further configured to:

receive an indication of the distance.

10. The RIS device of claim 9, wherein the one or more processors are further configured to:

transmit a request for the distance, wherein the one or more processors, to receive the indication of the distance, are configured to:

receive the indication of the distance as a response to the request.

11. The RIS device of claim 1, wherein the one or more processors are further configured to:

select the location of the first subset and the geometric shape of the first subset based at least in part on an effect that a combination of the location and the geometric shape have on a power level of the beam.

12. The RIS device of claim 1, wherein the one or more processors are further configured to:

select the location of the first subset and the geometric shape of the first subset based at least in part on power consumption by the RIS.

13. The RIS device of claim 1, wherein the one or more processors are further configured to:

select a number of the multiple surface partitions to include in the first subset of the multiple surface partitions based at least in part on power consumption by the RIS.

14. The RIS device of claim 13, wherein the one or more processors are further configured to:

receive an indication of the first subset of the multiple surface partitions, wherein the first subset of multiple partitions is based at least in part on the number, wherein the partition state change request indicates the number.

15. The RIS device of claim 13, wherein the one or more processors are further configured to:

select the first subset of the multiple surface partitions based at least in part on the number.

16. The RIS device of claim 15, wherein the partition state change request indicates the first subset of the multiple surface partitions.

17. The RIS device of claim 1, wherein the one or more processors, to deactivate the second subset of the multiple surface partitions, are configured to:

select a respective soft-off configuration for each surface partition of the second subset of the multiple surface partitions; and apply the respective soft-off configuration to each surface partition of the second subset of the multiple surface partitions.

18. The RIS device of claim 17, wherein the one or more processors, to select the respective soft-off configuration, are configured to:

select the respective soft-off configuration based at least in part on reflected signal suppression.

19. The RIS device of claim 17, wherein the one or more processors are further configured to:

transmit an indication of a soft-off dithering capability; and receive an instruction to deactivate each surface partition of the second subset of the multiple surface partitions based at least in part on using soft-off deactivation.

20. The RIS device of claim 1, wherein the one or more processors are further configured to:

receive an indication of a reference point; and update a surface reflection configuration for at least one surface partition of the first subset of the multiple surface partitions based at least in part on the reference point.

21. The RIS device of claim 20, wherein the one or more processors are further configured to:

receive a distance indication that is associated with the reference point, wherein the one or more processors, to update the surface reflection configuration, are configured to:

update the surface reflection configuration for the at least one surface partition of the first subset of the multiple surface partitions based at least in part on the distance indication and the reference point.

22. The RIS device of claim 21, wherein the one or more processors are further configured to:

calculate a propagation direction based at least in part on the distance indication and the reference point, wherein the one or more processors, to update the surface reflection configuration, are configured to:

update the surface reflection configuration for the at least one surface partition based at least in part on the propagation direction and beamforming the beam.

23. The RIS device of claim 21, wherein the distance indication is a first distance indication, and wherein the one or more processors are further configured to:
 receive a second distance indication that is associated with the reference point; and
 calculate a propagation direction based at least in part on the first distance indication and the reference point,
 wherein the one or more processors, to update the surface reflection configuration, are configured to:
  update the surface reflection configuration based at least in part on the propagation direction and beam-focusing the beam based at least in part on the second distance indication.

24. A network node for wireless communication, comprising:
 one or more memories; and
 one or more processors, coupled to the one or more memories, configured to:
  receive a partition state change request, wherein the reception of the partition state change request is based at least in part on a detection of a partition change trigger event; and
  transmit, based at least in part on the reception of the partition state change request, a partition configuration indication that is associated with configuring a surface of a reconfigurable intelligent surface (RIS) device that includes multiple surface partitions, the partition configuration indication associated with:
   activation of a first subset of the multiple surface partitions, the first subset of the multiple surface partitions being based at least in part on a location of the first subset on the surface, a geometric shape formed by the first subset, and a beam, and
   deactivation of a second subset of the multiple surface partitions.

25. The network node of claim 24, wherein the partition state change request is associated with changing an operating state of at least one surface partition of the multiple surface partitions.

26. The network node of claim 25, wherein the partition state change request indicates the at least one surface partition.

27. The network node of claim 24, wherein the one or more processors, to transmit the partition configuration indication, are configured to:
 transmit, as at least part of the partition configuration indication, an instruction to reconfigure a respective surface reflection configuration of one or more surface partitions of the first subset of the multiple surface partitions based at least in part on the beam.

28. The network node of claim 27, wherein the partition configuration indication specifies the first subset of the multiple surface partitions.

29. A method of wireless communication performed by a reconfigurable intelligent surface (RIS) device, comprising:
 transmitting a partition state change request, wherein transmitting the partition state change request is based at least in part on a detection of a partition change trigger event;
 receiving, based at least in part on transmitting the partition state change request, a partition configuration indication that is associated with configuring a surface of the RIS device that includes multiple surface partitions, the partition configuration indication associated with activating a first subset of the multiple surface partitions, the first subset of the multiple surface partitions being based at least in part on a location of the first subset on the surface, a geometric shape formed by the first subset, and a beam;
 activating the first subset of the multiple surface partitions; and
 deactivating a second subset of the multiple surface partitions, each surface partition in the second subset not being included in the first subset.

30. A method of wireless communication performed by a network node, comprising:
 receiving a partition state change request, wherein receiving the partition state change request is based at least in part on a detection of a partition change trigger event; and
 transmitting, based at least in part on receiving the partition state change request, a partition configuration indication that is associated with configuring a surface of a reconfigurable intelligent surface (RIS) device that includes multiple surface partitions, the partition configuration indication associated with:
  activation of a first subset of the multiple surface partitions, the first subset of the multiple surface partitions being based at least in part on a location of the first subset on the surface, a geometric shape formed by the first subset, and a beam, and
  deactivation of a second subset of the multiple surface partitions.

* * * * *